United States Patent
Pressler et al.

(10) Patent No.: US 7,891,481 B2
(45) Date of Patent: Feb. 22, 2011

(54) CONVEYOR BELT FOR MOUNTING OBLIQUE ROLLERS ON LATERAL RODS

(75) Inventors: Eric M. Pressler, New Orleans, LA (US); Matthew L. Fourney, Laurel, MD (US)

(73) Assignee: Laitram, L.L.C., Harahan, LA (US)

( * ) Notice: Subject to any disclaimer, the term of this patent is extended or adjusted under 35 U.S.C. 154(b) by 181 days.

(21) Appl. No.: 12/208,913

(22) Filed: Sep. 11, 2008

(65) Prior Publication Data

US 2010/0059338 A1    Mar. 11, 2010

(51) Int. Cl.
*B65G 17/16*    (2006.01)
(52) U.S. Cl. ........................ 198/779; 198/853
(58) Field of Classification Search ................. 198/779, 198/853
See application file for complete search history.

(56) References Cited

U.S. PATENT DOCUMENTS

| | | | |
|---|---|---|---|
| 4,748,907 A * | 6/1988 | Schermutzki | 100/153 |
| 4,765,455 A * | 8/1988 | Matsuno et al. | 198/779 |
| 5,224,583 A | 7/1993 | Palmaer et al. | |
| 6,318,544 B1 | 11/2001 | O'Connor et al. | |
| 6,364,038 B1 | 4/2002 | Driver | |
| 6,494,312 B2 | 12/2002 | Costanzo | |
| 6,585,110 B2 | 7/2003 | Layne et al. | |
| 6,758,323 B2 | 7/2004 | Costanzo | |
| 6,874,617 B1 | 4/2005 | Layne | |
| 6,932,211 B2 | 8/2005 | Wieting et al. | |
| 6,968,941 B2 | 11/2005 | Fourney | |
| 7,007,792 B1 | 3/2006 | Burch | |
| 7,073,659 B1 | 7/2006 | Lucchi | |
| 7,191,894 B2 | 3/2007 | Costanzo et al. | |
| 7,234,587 B2 | 6/2007 | Fandella | |
| 7,246,700 B2 | 7/2007 | Stebnicki et al. | |
| 7,252,192 B2 * | 8/2007 | Stebnicki et al. | 198/845 |
| 7,357,245 B2 | 4/2008 | Lee | |
| 7,494,006 B2 * | 2/2009 | Knott et al. | 198/850 |
| 7,527,143 B2 | 5/2009 | Krisl et al. | |
| 7,527,146 B2 | 5/2009 | Stebnicki et al. | |
| 2008/0121495 A1 | 5/2008 | Pressler et al. | |

FOREIGN PATENT DOCUMENTS

JP     8-277029 A     11/1996

* cited by examiner

*Primary Examiner*—Joe Dillon, Jr.
(74) *Attorney, Agent, or Firm*—James T. Cranvich

(57) ABSTRACT

A conveyor belt and a method for providing a conveyor belt with rollers that rotate on axes oblique to the direction of belt travel. Axles are mounted on rods extending perpendicular to direction of belt travel. The axles have cylindrical outer bearing surfaces that define a central axis that is oblique to the direction of belt travel when mounted on the rods. Rollers mounted on the axles rotate on the outer bearing surfaces in a direction oblique to the direction of belt travel.

16 Claims, 2 Drawing Sheets

CONVEYOR BELT FOR MOUNTING OBLIQUE ROLLERS ON LATERAL RODS

BACKGROUND

The invention relates generally to power-driven conveyors and, more particularly, to conveyor belts having article-engaging rollers that rotate in a direction oblique to the direction of belt travel.

Conveyor belts with rollers that rotate on axles oblique to the direction of belt travel are being used more and more in material handling applications such as accumulating, accelerating, sorting, singulating, diverting, and switching articles. The purpose of the obliquely oriented axles is to provide an oblique axis of rotation for the rollers. Other modular conveyor belts have rollers mounted on hinge pins, whose primary purpose is to interconnect rows of belt modules together at hinge joints so the belt can articulate about sprockets. Rollers may be mounted on the hinge rods at openings formed in the belt along the rods. But, because the hinge rod resides in the belt perpendicular to the direction of belt travel, the rollers on the rods rotate only in the direction of belt travel. Although these belts are suitable for accumulating and accelerating products, they are not able to divert, sort, singulate, or switch because the rollers rotate only in the direction of belt travel.

SUMMARY

These shortcomings and others are addressed by a conveyor belt embodying features of the invention. One version of such a conveyor belt comprises rods, such as hinge rods, disposed perpendicular to the direction of belt travel. The conveyor belt further comprises axles, each of which is mounted on a corresponding one of the rods. Each of the axles has a cylindrical outer bearing surface that defines a central axis oblique to the direction of belt travel. A roller is mounted on each axle for rotation on the outer bearing surface about the central axis of the corresponding axle. Each of the axles has a bore oblique to the central axis for receiving the corresponding rod.

Another version of the conveyor belt comprises belt modules arranged in a series of rows. Each row has spaced apart hinge elements with aligned apertures along leading and trailing ends. The hinge elements along a leading end of a row are interleaved with the hinge elements along the trailing end of a leading row to form a lateral passageway between consecutive rows perpendicular to the direction of belt travel. Hinge rods, each received in one of the lateral passageways, connect the rows into an endless belt. The hinge elements are spaced apart non-uniformly along each end to provide one or more large openings disposed between laterally consecutive interleaved hinge elements and traversed by the hinge rods. A plurality of axles, each disposed in a corresponding large opening and having a cylindrical outer bearing surface that defines the central axis. A bore through the axle oblique to the central axis receives a corresponding one of the hinge rods. The conveyor belt further comprises a plurality of rollers, each mounted on a corresponding axle for rotation on the outer bearing surface about the central axis of the corresponding axle.

BRIEF DESCRIPTION OF THE DRAWINGS

These aspects and features of the invention, as well as its advantages, are explained in more detail in the following description, appended claims, and accompanying drawings, in which:

DETAILED DESCRIPTION

Figure 1:
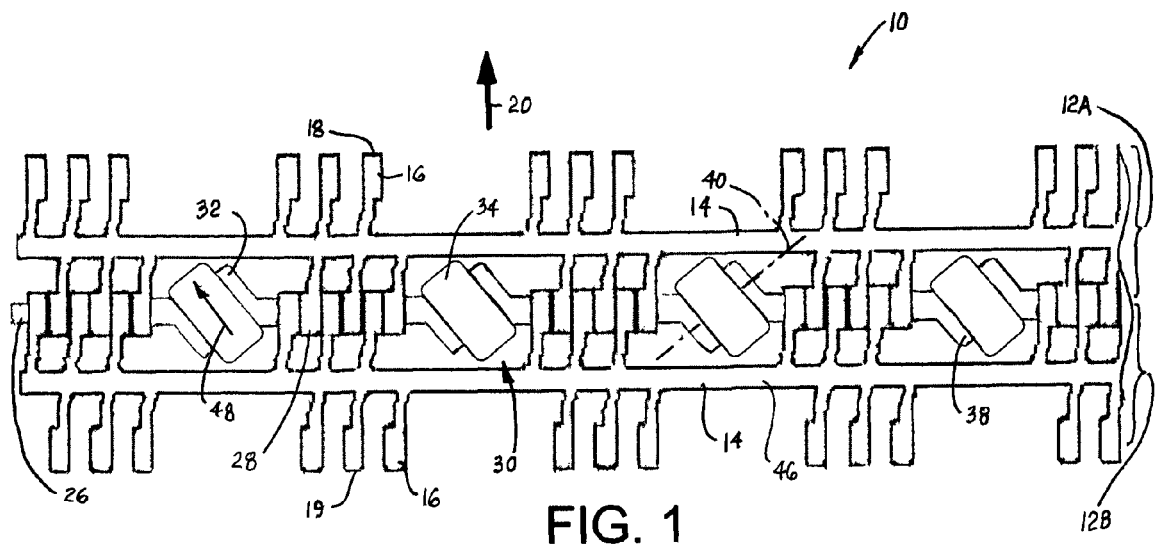
FIG. 1 is a top plan view of a portion of a conveyor belt embodying features of the invention including oblique roller axles mounted on hinge rods.
Figure 2:
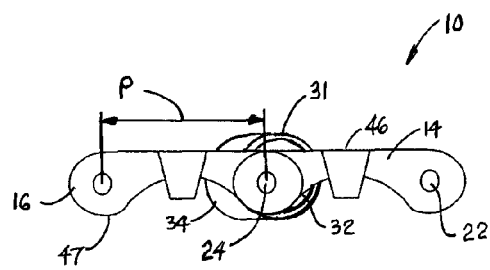
FIG. 2 is a side elevation view of the conveyor belt of FIG. 1.

A portion of a conveyor belt embodying features of the invention is shown in FIGS. 1 and 2. The conveyor belt 10 shown in this example is a modular plastic conveyor belt constructed of a series of rows 12A, 12B of one or more belt modules 14. Each row has hinge elements 16 laterally spaced apart on leading and trailing ends 18, 19 relative to a direction of belt travel 20. The hinge elements along the trailing end of the leading row 12A are interleaved with the hinge elements along the leading end of the trailing row 12B. Apertures 22 through the interleaved hinge elements are aligned to form a lateral passageway 24 between consecutive rows. A rod 26 is received in each passageway to form a hinge joint 28 between rows at which the belt can articulate. The hinge rods, which are regularly spaced perpendicular to the direction of belt travel a distance P, representing the belt's pitch, also connect the rows together into an endless belt.

As best shown in FIG. 1, the hinge elements 16 are non-uniformly spaced along each end of the rows 12 to provide large openings 30 between laterally consecutive interleaved hinge elements. (The large openings are large compared to the gaps, if any, between adjacent interleaved hinge elements.) The openings are positioned so that they are traversed by the hinge rods 26. The openings are large enough to admit a roller assembly 31 comprising a roller 34 mounted for rotation on an axle 32.

Figure 3:
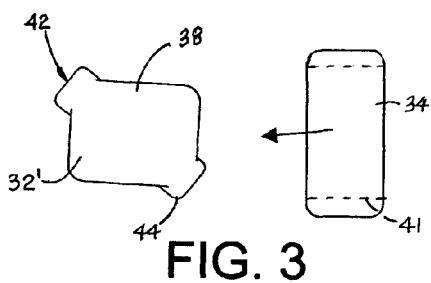
FIG. 3 is an exploded top plan view of a one-piece axle version of the oblique axle and roller in the conveyor belt of FIG. 1.
Figure 4:
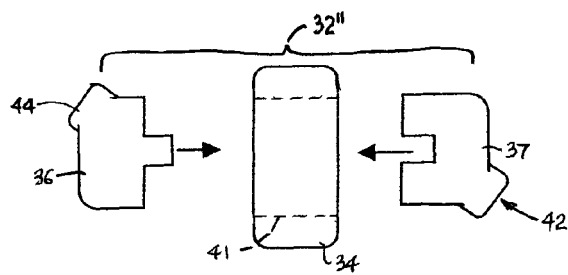
FIG. 4 is an exploded top plan view of a two-piece axle version of the oblique axle and roller in the conveyor belt of FIG. 1.
Figure 5:
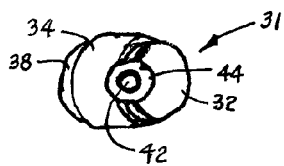
FIG. 5 is a side elevation view of the axle and roller of FIG. 3 or 4.

The axle may be a one-piece axle 32' as shown in FIG. 3 or a two-piece axle 32" comprising two mating portions 36, 37, as in FIG. 4. FIG. 5 shows a side view of the roller assembly 31 of either FIG. 3 or FIG. 4. The axles have a cylindrical outer bearing surface 38 on which the roller rolls. The cylindrical surface defines a central axis 40 that is oblique to the direction of belt travel. Each roller has a bore 41 that receives the outer surface of the axle with the axle's central axis defining the roller's axis of rotation. The axles mount on the hinge rods received in axle bores 42 intersecting the central axis at an oblique angle to maintain the axis of rotation of the rollers oblique to the direction of belt travel. Sleeves 44 protruding outward from the axles at each end form continuations, or extensions, of the bore encircling the hinge rod.

As best shown in FIGS. 1 and 2, the conveyor belt extends in thickness from a top conveying surface 46 to an opposite surface 47. The diameter of the rollers 34 is preferably greater than the thickness of the belt. Salient portions of the rollers protrude past the openings in the belt beyond the conveying and opposite surfaces. In this way, the rollers can support conveyed articles on the top conveying side and ride on bearing surfaces below, causing the rollers to rotate as the belt advances and propel articles conveyed atop the rollers in a direction 48 oblique to the direction of belt travel.

Figure 6:
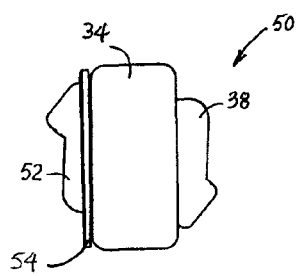
FIG. 6 is a top plan view of another version of oblique axle having a roller-retaining flange usable in a conveyor belt as in FIG. 1.

Another version of roller assembly is shown in FIG. 6. The roller assembly 50 has an axle 52 with a flange 54 at one end. The flange, which is shown as a disk-shaped shoulder concentric with the outer bearing surface 38 of the axle, serves to limit the translation of the roller on the axle and provides a low-friction wear surface against which the side of the roller rubs as it rotates.

Figure 7:
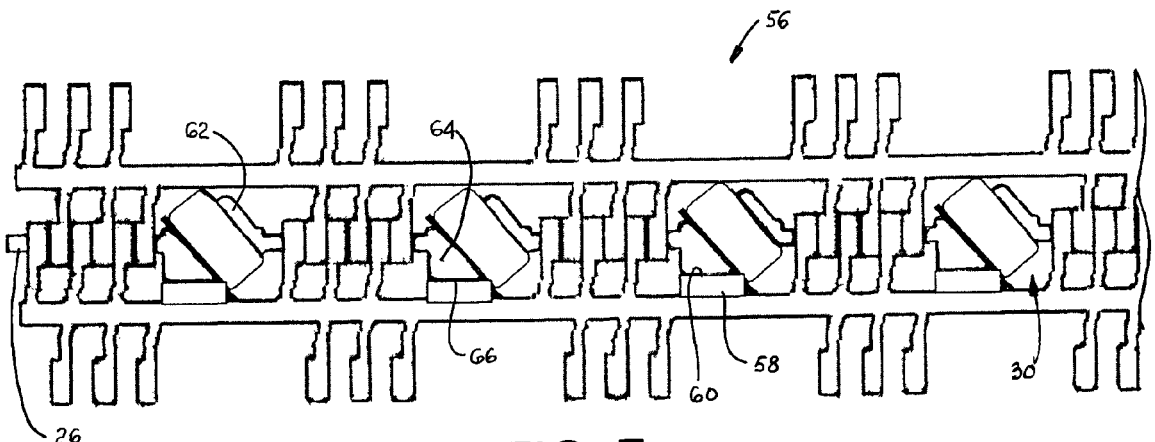
FIG. 7 is a top plan view of a portion of another version of a conveyor belt embodying features of the invention including interfering structure on the axles to prevent the axle from rotating.

For best results, the axle is preferably stationarily affixed on the hinge rod. The axle of FIG. 1 may be affixed to the rod or to the hinge elements by adhesives or welding, for example. But FIG. 7 shows an alternative conveyor belt 56 that holds the axle stationary. Extending into the openings 30 formed in the belt are tabs 58 with flat sides 60 bounding the openings. The tab may be a separately formed piece fastened to the belt or unitarily molded with the belt module. An axle 62, similar to the axle 32 of FIG. 1 or FIG. 6, but having interfering structure 64 with a flat surface 66 at one end, is mounted on the hinge rod 26 in each opening. The interfering structure of the axle interferes with the tab to prevent the axle from rotating. The abutment of the flat surface of the axle with the flat side of the tab holds the axle in a stable position.

Figure 8:
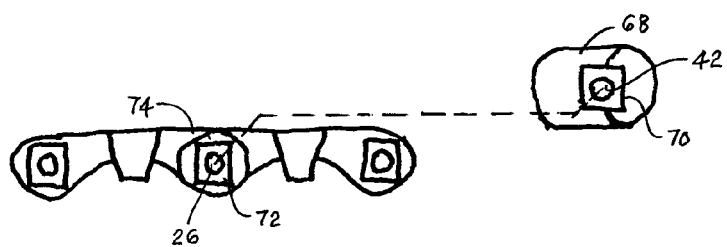
FIG. 8 is an exploded side elevation view of another version of a conveyor belt and an axle embodying features of the invention including recesses in the module keyed to receive mating key structure at the ends of sleeved bore extensions.

Another interference feature is shown in FIG. 8. In this example, each axle 68 has a sleeve 70 with a rectangular outer surface forming key structure extending outward around the bore 42. The key structure mates with complementary keyed recesses 72 formed in the conveyor belt modules 74 around the hinge rods 26. In this way, the axles are prevented from rotating on the hinge rods.

Although the invention has been described in detail with reference to a few preferred versions, other versions are possible. For example, the axles are shown mounted on hinge rods, but could be mounted on any rods or pins supported in the belt. As another example, the rectangular keyed structure of FIG. 8 could be any shape that prevents the axle from rotating. So, as these few examples suggest, the scope of the claims is not meant to be limited to the preferred versions described in detail.

What is claimed is:

1. A conveyor belt comprising:
   a plurality of rods disposed perpendicular to a direction of belt travel;
   a plurality of axles, each of the axles mounted on a corresponding one of the rods and having a cylindrical outer bearing surface defining a central axis oblique to the direction of belt travel;
   a plurality of rollers, each of the rollers mounted on a corresponding one of the axles for rotation on the outer bearing surface about the central axis of the corresponding one of the axles;
   wherein each of the axles has a bore oblique to the central axis for receiving the corresponding one of the rods.

2. A conveyor belt as in claim 1 further comprising a conveying surface and an opposite surface across the thickness of the conveyor belt and a plurality of openings through the thickness of the conveyor belt opening onto at least one of the conveying and opposite surfaces, wherein each of the openings is traversed by one of the rods.

3. A conveyor belt as in claim 2 wherein the axles have interfering structure at an end that interferes with the conveyor belt at the openings to prevent the axles from rotating on the rods.

4. A conveyor belt as in claim 3 wherein the interfering structure of the axles includes a flat surface and wherein the conveyor belt includes a tab having a flat side that engages with the flat surface to prevent the axles from rotating on the rods.

5. A conveyor belt as in claim 2 wherein the rollers protrude outward past the conveying and opposite surfaces of the belt.

6. A conveyor belt as in claim 1 wherein the axles have sleeves protruding outward from the axles to form a continuation of the bore at each end.

7. A conveyor belt as in claim 6 further comprising keyed recesses formed in the conveyor belt around the rods and opening into the openings and wherein the sleeves have key structure that mates with the recesses to prevent the axles from rotating on the rods.

8. A conveyor belt as in claim 1 wherein the rods are uniformly spaced hinge rods extending across the width of the conveyor belt and forming hinge joints at which the conveyor belt articulates.

9. A conveyor belt as in claim 1 wherein the axles have a flange at one end.

10. A conveyor belt as in claim 1 wherein the axles comprise two mating portions.

11. A conveyor belt comprising:
    a plurality of belt modules arranged in a series of rows, each row having spaced apart hinge elements with aligned apertures along leading and trailing ends with the hinge elements along the leading end of a row interleaved with the hinge elements along the trailing end of a leading row to form a lateral passageway between consecutive rows perpendicular to a direction of belt travel;
    a plurality of hinge rods, each received in one of the lateral passageways to connect the rows into an endless belt;
    wherein the hinge elements are spaced apart non-uniformly along each end of the rows to provide one or more large openings disposed between laterally consecutive interleaved hinge elements and traversed by the hinge rod;
    a plurality of axles, each of the axles disposed in a corresponding one of the large openings and having a cylindrical outer bearing surface defining a central axis and having a bore oblique to the central axis, the bore receiving a corresponding one of the hinge rods;
    a plurality of rollers, each of the rollers mounted on a corresponding one of the axles for rotation on the outer bearing surface about the central axis of the corresponding one of the axles.

12. A conveyor belt as in claim 11 wherein the axles include a flange at one end to restrict the translation of the rollers along the central axis of the axles.

13. A conveyor belt as in claim 11 wherein the axles have sleeves protruding outward from the axles to form a continuation of the bore at each end.

14. A conveyor belt as in claim 13 further comprising keyed recesses formed in the sides of the hinge elements bounding the openings around the passageway and opening into the openings and wherein the sleeves have key structure that mates with the recesses to prevent the axles from rotating on the rods.

15. A conveyor belt as in claim 11 wherein the axles include a flat surface at one end and wherein the belt modules include tabs having a flat side protruding into the openings that engages with the flat surface to prevent the axles from rotating on the rods.

16. A conveyor belt as in claim 11 wherein the axles comprise two mating portions.

* * * * *